(12) United States Patent
Carminati et al.

(10) Patent No.: US 11,661,985 B2
(45) Date of Patent: May 30, 2023

(54) METHOD FOR MAKING A BRAKE DISC AND BRAKE DISC FOR DISC BRAKE

(71) Applicant: FRENI BREMBO S.P.A., Curno (IT)

(72) Inventors: Fabiano Carminati, Curno (IT); Paolo Vavassori, Curno (IT)

(73) Assignee: Brembo S.p.A., Bergamo (IT)

( * ) Notice: Subject to any disclaimer, the term of this patent is extended or adjusted under 35 U.S.C. 154(b) by 105 days.

(21) Appl. No.: 16/634,261

(22) PCT Filed: Jul. 24, 2018

(86) PCT No.: PCT/IB2018/055481
§ 371 (c)(1),
(2) Date: Jan. 27, 2020

(87) PCT Pub. No.: WO2019/021161
PCT Pub. Date: Jan. 31, 2019

(65) Prior Publication Data
US 2020/0378459 A1      Dec. 3, 2020

(30) Foreign Application Priority Data

Jul. 28, 2017   (IT) .................. 102017000086975

(51) Int. Cl.
| F16D 65/12 | (2006.01) |
| C23C 4/129 | (2016.01) |
| C23C 4/02 | (2006.01) |
| C23C 4/06 | (2016.01) |
| C23C 4/10 | (2016.01) |
| C23C 24/04 | (2006.01) |
| F16D 69/02 | (2006.01) |

(Continued)

(52) U.S. Cl.
CPC .............. *F16D 65/127* (2013.01); *C23C 4/02* (2013.01); *C23C 4/06* (2013.01); *C23C 4/10* (2013.01);

(Continued)

(58) Field of Classification Search
CPC . F16D 65/125–127; F16D 65/123–128; F16D 69/02; F16D 69/027;
(Continued)

(56) References Cited

U.S. PATENT DOCUMENTS 4,146,654 A * 3/1979 Guyonnet ............... B05B 7/226
219/121.47
4,715,486 A   12/1987 Burgdorf et al.
(Continued)

FOREIGN PATENT DOCUMENTS

DE   102008035849 A1   2/2010
DE   102009003161 A1   11/2010
(Continued)

OTHER PUBLICATIONS

European Patent Office, International Search Report with Written Opinion, issued in PCT/IB2018/055481, dated Oct. 12, 2018, 10 pages, Rijswijk, Netherlands.

*Primary Examiner* — Christopher P Schwartz
(74) *Attorney, Agent, or Firm* — Marshall & Melhorn, LLC

(57) ABSTRACT

A method for making a brake disc may include providing a disc brake with a braking band and depositing on the disc a layer of chromium carbide and nickel-chromium in particle form to form a base protective coating. The method may also include depositing on the base protective coating a material in particle form consisting of tungsten carbide, iron, chromium and aluminium to form a surface protective coating made of tungsten carbide, iron, chromium and aluminium. Both protective coatings may be made by High Velocity Oxygen Fuel or High Velocity Air Fuel or Kinetic Metallization techniques.

8 Claims, 2 Drawing Sheets

(51) Int. Cl.
*F16D 65/02* (2006.01)
*F16D 69/00* (2006.01)

(52) U.S. Cl.
CPC .............. *C23C 4/129* (2016.01); *C23C 24/04* (2013.01); *F16D 65/125* (2013.01); *F16D 69/02* (2013.01); *F16D 69/027* (2013.01); *F16D 65/123* (2013.01); *F16D 2065/132* (2013.01); *F16D 2069/005* (2013.01); *F16D 2200/003* (2013.01); *F16D 2200/0004* (2013.01); *F16D 2200/0008* (2013.01); *F16D 2200/0013* (2013.01); *F16D 2200/0021* (2013.01); *F16D 2200/0039* (2013.01); *F16D 2250/0046* (2013.01)

(58) Field of Classification Search
CPC ......... F16D 2065/132; F16D 2069/005; F16D 2200/0004; F16D 2200/0008; F16D 2200/0013; F16D 2200/0021; F16D 2200/003; F16D 2200/0039; F16D 2250/0046; C23C 4/02; C23C 4/06; C23C 4/10; C23C 4/129
USPC ........ 188/18 A, 218 R, 218 XL; 192/107 M; 427/451
See application file for complete search history.

(56) References Cited

U.S. PATENT DOCUMENTS

| | | | | |
|---|---|---|---|---|
| 5,612,110 | A * | 3/1997 | Watremez | F16D 69/027 428/614 |
| 8,877,296 | B2 * | 11/2014 | Lembach | F16D 65/127 427/451 |
| 9,879,740 | B2 | 1/2018 | Tironi et al. | |
| 11,035,427 | B2 * | 6/2021 | Carminati | F16D 65/125 |
| 2004/0124231 | A1 * | 7/2004 | Hasz | B23K 35/3046 228/245 |
| 2009/0026026 | A1 * | 1/2009 | Martino | C22C 29/005 188/218 XL |
| 2009/0280005 | A1 * | 11/2009 | Schmitz | C23C 28/3455 415/177 |
| 2013/0177437 | A1 * | 7/2013 | Amancherla | C23C 4/02 416/241 R |
| 2015/0354647 | A1 * | 12/2015 | Tironi | F16D 65/125 427/451 |
| 2016/0130519 | A1 * | 5/2016 | Zhao | C10M 103/02 508/109 |
| 2016/0130705 | A1 * | 5/2016 | Nardi | C23C 4/10 427/404 |
| 2016/0290423 | A1 * | 10/2016 | Tironi | F16D 65/127 |
| 2019/0056003 | A1 | 2/2019 | Carminati et al. | |
| 2020/0217382 | A1 * | 7/2020 | Kuckert | C23C 4/02 |
| 2023/0018275 | A1 * | 1/2023 | Giammarinaro | C23C 8/56 |

FOREIGN PATENT DOCUMENTS

| | | |
|---|---|---|
| DE | 102016200951 A1 | 7/2017 |
| FR | 2631044 A1 | 11/1989 |
| WO | WO2014/097186 A1 | 6/2014 |
| WO | WO2014/097187 A2 | 6/2014 |
| WO | WO2017/04661 A1 | 3/2017 |

* cited by examiner

METHOD FOR MAKING A BRAKE DISC AND BRAKE DISC FOR DISC BRAKE

FIELD OF APPLICATION

The present invention relates to a method for making a brake disc and brake disc for disc brake.

BACKGROUND ART

A brake disc of a disc brake system of a vehicle comprises an annular structure, or braking band, and a central fixing element, known as the bell, by means of which the disc is fixed to the rotating part of a vehicle suspension, e.g. a hub. The braking band is provided with opposing braking surfaces adapted to cooperate with friction elements (brake pads), housed in at least one caliper body placed astride the braking band and integral with a non-rotating component of the vehicle suspension. The controlled interaction between the opposing brake pads and the opposite braking surfaces of the braking band determine a braking action by friction which allows the deceleration or stopping of the vehicle.

Generally, the brake disc is made of gray cast iron or steel. Indeed, this material allows to obtain good braking performance (especially in terms of wear containment) at relatively low cost. Discs made of carbon or carbo-ceramic materials offer much greater performance, but at a much higher cost.

The limits of traditional discs, made of cast iron or steel, are related to excessive wear. As regards discs made of gray cast iron, another very negative aspect is related to excessive surface oxidation, with consequent formation of rust. This aspect impacts both the performance of the brake disc and its appearance since the rust on the brake disc is aesthetically unacceptable for users. Attempts have been made to tackle such problems by providing the discs made of gray cast iron or steel with a protective coating. The protective coating, on the one hand, reduces disc wear, and on the other, protects the gray cast iron base from surface oxidation, whereby preventing the formation of a layer of rust. The protective coatings currently available and applied on discs, while offering wear-resistance, are however subject to peeling which causes their detachment from the disc itself.

Discs made of aluminum have been suggested alternatively to discs made of gray cast iron or steel in order to reduce the weight of the disc. Aluminum discs are provided with protective coatings. The protective coating, on the one hand, reduces disc wear, whereby guaranteeing performance comparable to that of cast iron discs, and on the other protects the aluminum base from the temperatures which are generated during braking, which are much higher than the softening point of aluminum (200-400° C.)

The protective coatings currently available and applied on aluminum discs and on gray cast iron or steel discs, while offering wear-resistance, are however subject to peeling which causes their detachment from the disc itself.

A protective coating of this type is described, for example, in U.S. Pat. No. 4,715,486, relative to a low-wear disc brake. The disc, made in particular of cast iron, has a coating made of a particle material deposited on the disc by high kinetic energy impacting technique. According to a first embodiment, the coating contains from 20% to 30% of tungsten carbide, 5% of nickel and the remaining part of a mixture of chromium carbides and tungsten. According to a second embodiment, the coating contains from 80% to 90% of tungsten carbide, up to 10% cobalt, up to 5% of chromium and up to 5% of carbon.

In the case of application of the coating with flame spray techniques, because of the detachment of the conventional protective coatings from discs made of aluminum or aluminum alloy is the presence of free carbon in the protective coating. This phenomenon also affects discs made of gray cast iron or steel. Indeed, the carbon tends to burn, combining with the oxygen incorporated in the protective coating being formed. This leads to the formation of micro-bubbles inside the coating, which can prevent an adequate adhesion of the coating onto the disc, whereby facilitating its removal.

From the above, it is apparent that the discs made of aluminum or aluminum alloy or of gray cast iron or steel provided with protective coatings cannot be currently used in the field of braking systems.

However, taking the advantages in terms of wear-resistance, guaranteed by the protective coatings, into account the need is strongly felt in the field to solve the drawbacks mentioned above with reference to the prior art. In particular, the need is felt for aluminum discs or in gray cast iron or steel equipped with protective coatings which can increase the wear-resistance of the disc and are at the same time strong over time.

A solution to the aforesaid problems was suggested by this Applicant in international application WO2014/097187 for discs made of gray cast iron or steel and in the international application WO2014/097186 for aluminum discs.

In the case of discs made of gray cast iron or steel, it consists in making a protective coating on the braking surfaces of a disc brake obtained by depositing a material in particle form consisting of 70 to 95% by weight of tungsten carbide, from 5% to 15% by weight of cobalt and from 1% to 10% by weight of chromium. The deposition of the material in particle form is obtained by means of HVOF (High Velocity Oxygen Fuel) or HVAF (High Velocity Air Fuel) or KM (Kinetic Metallization) techniques.

More in detail, according to the solution offered in WO2014/097187 the combination of the HVOF, HVAF or KM deposition techniques and of the chemical components used for forming the coating allows to obtain a protective coating with high bond strength, which ensures a high degree of anchoring on gray cast iron or steel. The particle material used does not contain free carbon (C), not even in trace form. This allows to significantly reduce the protective coating peeling phenomena.

In the case of discs made of aluminum or aluminum alloy, the material in particle form used to make the protective coating consists of 80 to 90% by weight of tungsten carbide, from 8% to 12% by weight of cobalt and from 2% to 6% by weight of chromium. Also in this case, the deposition of the material in particle form is obtained by means of HVOF (High Velocity Oxygen Fuel) or HVAF (High Velocity Air Fuel) or KM (Kinetic Metallization) techniques.

In order to obtain effects similar to those for gray cast iron or steel discs, i.e. to obtain a protective coating with high bond strength and reduction of peeling related to the presence of free carbon.

The adoption of the solution offered in WO2014/097187 for discs made of gray cast iron or steel or in WO2014/097186 for discs made of aluminum or aluminum alloy allows to significantly reduce the protective coating peeling phenomena found in the known prior art, but not to eliminate them completely. Indeed, even in discs made of aluminum or aluminum alloy or cast iron or steel provided with a protective coating made according to WO2014/097186 or WO2014/097187, peeling and subsidence of the protective coating continue to occur, although at a lesser frequency than in the known prior art.

A solution to the problem of peeling and subsidence of the protective coating has been offered by this Applicant in international application WO2017046681A1. In particular, such a solution includes making a base protective coating consisting of 65% to 95% of chromium carbide (Cr3C2) and for the rest of nickel-chromium (NiCr) between the protective coating and the braking surfaces. The surface protective coating, made over the base protective coating consists of 80 to 90% by weight of tungsten carbide (WC) and the rest by cobalt (Co). The deposition of the material in particle form for both protective coatings is obtained by means of HVOF (High Velocity Oxygen Fuel) or HVAF (High Velocity Air Fuel) or KM (Kinetic Metallization) techniques. This solution can be applied on discs made of aluminum, gray cast iron or steel.

The technical solution offered by WO2017046681A1, while being effective, has the drawback of containing cobalt (Co) in the surface protective coating. This solution is no longer acceptable because of the hazardousness of cobalt for human health. Indeed, there is a risk that the surface coating may disperse cobalt dust into the environment over time, due to wear.

So, the need for discs (made of aluminum or gray cast iron or steel) provided with protective coatings which are not subject to peeling or are subject thereto to a much lesser degree than the known solutions continues to exist in the reference field, so as to ensure wear-resistance over time and, at the same time, not contain cobalt.

Presentation of the Invention

The need for discs provided with protective coatings which are not subject to peeling or are subject to it to a much lesser degree than the known solutions, so as to guarantee wear-resistance over time, and which at the same time do not contain cobalt, is met by a method for manufacturing a brake disc and by a brake disc for disc brakes according to the claims.

In particular, this need is met by a method for manufacturing a brake disc made of aluminum with protective coating comprising the following operating steps:

a) arranging a brake disc, comprising a braking band provided with two opposed braking surfaces, each of which defines at least partially one of two main sides of the disc, the braking band being made of aluminum or aluminum alloy or being made of gray cast iron or steel;

b) depositing on the disc a layer of chromium carbide (Cr3C2) and nickel-chromium (NiCr) in particle form by HVOF (High Velocity Oxygen Fuel) technique or by HVAF (High Velocity Air Fuel) technique or by KM (Kinetic Metallization) technique, whereby forming a base protective coating covering at least one of the two braking surfaces of the braking band in direct contact therewith; and c) depositing on said base protective coating a material in particle form consisting of tungsten carbide (WC), iron (Fe), chromium (Cr) and aluminum (Al) by HVOF (High Velocity Oxygen Fuel) technique or by HVAF (High Velocity Air Fuel) technique or by KM (Kinetic Metallization) technique, forming a surface protective coating, consisting of tungsten carbide (WC) and iron (Fe), chromium (Cr) and aluminum (Al) and covering at least one of the two braking surfaces of the braking band.

Preferably, the material in particle form deposited in the step b) of depositing for making the base protective coating 30 consists of 65% to 95% of chromium carbide (Cr3C2) and nickel-chromium (NiCr) for the rest.

In particular, the material in particle form deposited in step b) of depositing to make the base protective coating 30 may have the following compositions:

93% by weight of chromium carbide (Cr3C2), and 7% of nickel-chromium (NiCr);

from 90% by weight of chromium carbide (Cr3C2), and 10% of nickel-chromium (NiCr);

from 75% by weight of chromium carbide (Cr3C2), and 25% of nickel-chromium (NiCr); or from 65% by weight of chromium carbide (Cr3C2), and 35% of nickel-chromium (NiCr).

Preferably, the material in particle form deposited in the step b) of depositing for making the base protective coating 30 consists of 75% by weight of chromium carbide (Cr3C2) and 25% of nickel-chromium (NiCr).

Preferably, the nickel-chromium (NiCr) consists of 80% of nickel and 20% of chromium.

Preferably, the material in particle form deposited in the step c) of depositing for making the surface protective coating 3 consists of 75% to 87% by weight of tungsten carbide (WC) and iron (Fe), chromium (Cr) and aluminum (Al) for the rest.

Preferably, the material in particle form deposited in the step c) of depositing for making the surface protective coating 3 consists of 10% to 17% by weight of iron (Fe), from 2.5% to 5.8% by weight of chromium (Cr), 0.6% to 2.2% by weight of aluminum (Al) and the rest by tungsten carbide (WC).

Even more preferably, the material in particle form deposited in the step c) of depositing for making the surface protective coating 3 consists of 85% by weight of tungsten carbide (WC) and 15% by weight of iron (Fe), chromium (Cr) and aluminum (Al).

According to a particularly preferred embodiment of the invention, both the material in particle form deposited in the step b) of depositing for making the base protective coating and the material in particle form deposited in the step c) of depositing for making the surface protective coating are deposited by means of HVOF (High Velocity Oxygen Fuel) technique.

Preferably, the thickness of the base protective coating 3 is between 20 µm and 60 µm, and preferably equal to 40 µm.

Preferably, the thickness of the surface protective coating 3 is between 30 µm and 70 µm, and preferably equal to 50 µm.

Advantageously, the material in particle form which is deposited in step b) for forming the base protective coating has a particle size between 5 and 40 µm.

Advantageously, the material in particle form which is deposited in step c) for forming the surface protective coating has a particle size between 5 and 45 µm.

According to a particularly preferred implementation of the invention, the step b) of depositing comprises two or more separate steps of depositing chromium carbide (Cr3C2) and nickel-chromium (NiCr) on the same surface to form the base protective coating.

In particular, the step b) of depositing comprises a first step of depositing chromium carbide (Cr3C2) and nickel-chromium (NiCr) in particle form to create a first layer of the base protective coating directly on the disc and a second step of depositing chromium carbide (Cr3C2) and nickel-chromium (NiCr) in particle form to create a second layer over the first layer, the chromium carbide (Cr3C2) and nickel-chromium (NiCr) deposited in the first deposition step having a particle size greater than that deposited in the second deposition step.

Even more in particular, the chromium carbide (Cr3C2) and nickel-chromium (NiCr) deposited in the first deposition step have a particle size of between 30 and 40 µm, while the chromium carbide (Cr3C2) and the nickel-chromium (NiCr) deposited in the second deposition step have a particle size of between 5 and 20 µm.

Preferably, in step b) the deposition of chromium carbide (Cr3C2) and nickel-chromium (NiCr) in particle form is performed in a differentiated manner on the surface of the disc at least in terms of the thickness of the coating.

In particular, each main face of the disc is defined by at least one first annular portion, corresponding to a braking surface of the braking band, and by a second annular portion which is more internal than the first one and which defines the mounting area of the disc to a vehicle. A base protective coating covering at least both portions is made during the step b) of depositing. The thickness of the base protective coating formed on the first annular portion is greater than that of the base protective coating made on the second portion.

Advantageously, step c) of depositing the tungsten carbide (WC), iron (Fe), chromium (Cr) and aluminum (Al) comprises two or more distinct steps of depositing the particle material onto the same surface to form the surface protective coating.

In particular, the step c) of depositing comprises a first step of depositing the material in particle form to create a first surface protective coating layer directly on the base protective coating and a second step of depositing the material in particle form to create a second layer on the first layer. The particle material deposited in the first deposition step has a particle size greater than that deposited with the second deposition step.

Even more in particular, the particle material (tungsten carbide, iron, chromium and aluminum) deposited in the first deposition step has a particle size between 30 and 45 µm, while the particle material deposited in the second deposition step has a particle size between 5 and 20 µm.

Preferably, in step c) of depositing the particle material (tungsten carbide, iron, chromium and aluminum) is deposited in a differentiated manner on the surface of the disc at least in terms of the thickness of the coating. In particular, the thickness of the surface protective coating formed on the first annular portion is greater than that of the surface protective coating made on the second portion.

In particular, the need for discs equipped with protective coatings which are not subject to peeling or are subject to it to a much lesser degree than the known solutions and at the same time do not contain cobalt, is met by a brake disc for a disc brake, comprising a braking band provided with two mutually opposite braking surfaces, each of which at least partially defines one of the two main faces of the disc.

The braking band may be made of aluminum or aluminum alloy or may be made of cast iron or steel.

According to a particularly preferred embodiment of the invention, the braking band of the disc is made of gray cast iron. In particular, the entire disc is made of gray cast iron.

The disc is provided with a base protective coating which covers at least one of the two braking surfaces of the braking band. The base protective coating consists of chromium carbide (Cr3C2) and nickel-chromium (NiCr) and is obtained by depositing directly on the disc chromium carbide (Cr3C2) and nickel-chromium (NiCr) in particle form by HVOF (High Velocity Oxygen Fuel) technique or by HVAF (High Velocity Air Fuel) technique or by KM (Kinetic Metallization) technique.

The disc is further provided with a surface protective coating which covers at least one of the two braking surfaces of the braking band.

According to the invention, the surface protective coating consists of tungsten carbide (WC), iron (Fe), chromium (Cr) and aluminum (Al) and is obtained by depositing on the base protective coating tungsten carbide (WC), iron (Fe), chromium (Cr) and aluminum (Al) in particle form by HVOF technique or by HVAF (High Velocity Air Fuel) technique or by KM (Kinetic Metallization) technique.

Preferably, the base protective coating consists of 65% to 95% of chromium carbide (Cr3C2) and the rest of nickel-chromium (NiCr).

In particular, the base protective coating may have the following compositions:
 93% by weight of chromium carbide (Cr3C2), and 7% of nickel-chromium (NiCr);
 from 90% by weight of chromium carbide (Cr3C2), and 10% of nickel-chromium (NiCr);
 from 75% by weight of chromium carbide (Cr3C2), and 25% of nickel-chromium (NiCr); or
 from 65% by weight of chromium carbide (Cr3C2), and 35% of nickel-chromium (NiCr).

Preferably, the base protective coating consists of 75% by weight of chromium carbide (Cr3C2) and of 25% of nickel-chromium (NiCr).

Preferably, the nickel-chromium (NiCr) consists of 80% of nickel and 20% of chromium.

Preferably, the surface protective coating consists of 75% to 87% by weight of tungsten carbide (WC) and iron (Fe), chromium (Cr) and aluminum (Al) for the rest.

Even more preferably, the surface protective coating consists of 85% by weight of tungsten carbide (WC) and 15% by weight of iron (Fe), chromium (Cr) and aluminum (Al).

Advantageously, the thickness of the base protective coating is between 20 µm and 60 µm, and preferably equal to 40 µm.

Advantageously, the thickness of the surface protective coating is between 30 µm and 70 µm, and preferably equal to 50 µm.

DESCRIPTION OF THE DRAWINGS

Further features and advantages of the present invention will become more comprehensible from the following description of preferred embodiments given by way of non-limiting examples, in which.

Elements or parts in common to the embodiments described below will be indicated using the same reference numerals.

DETAILED DESCRIPTION

Figure 1:
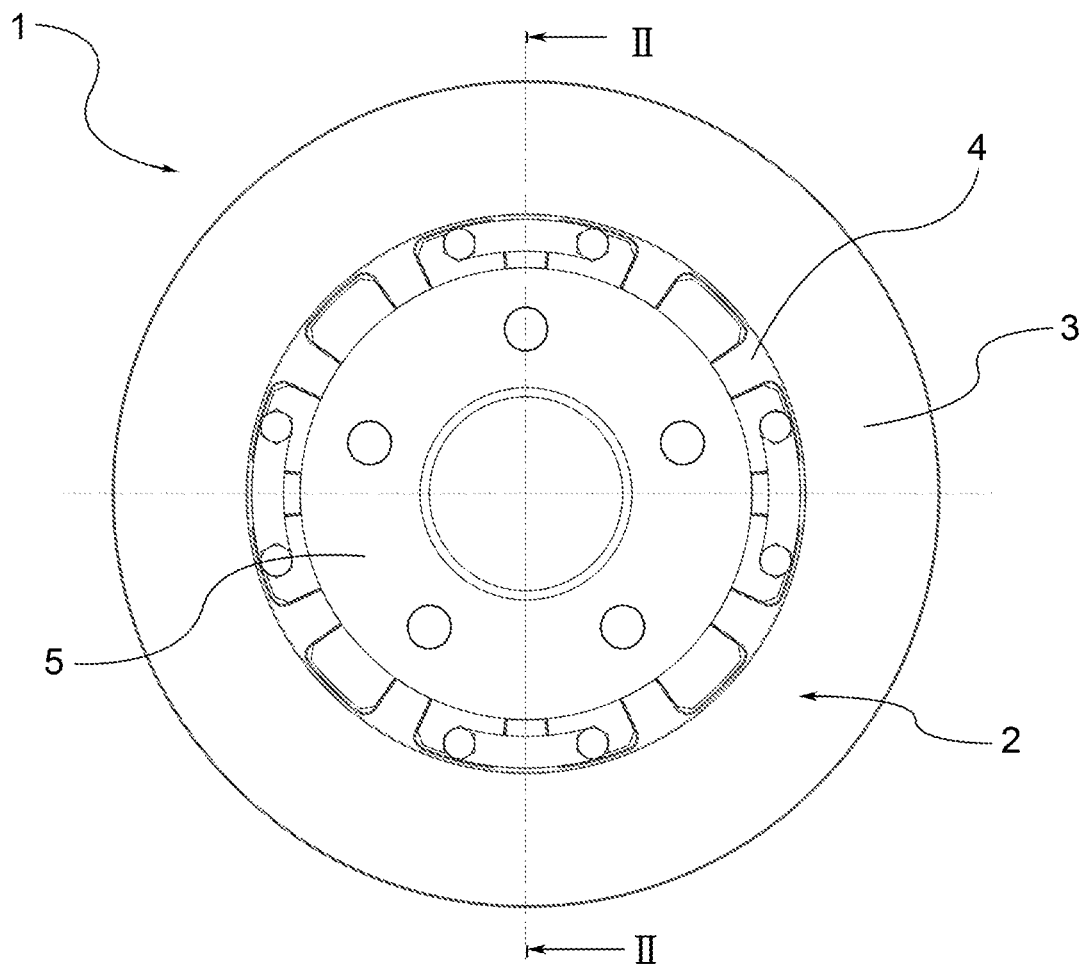
FIG. 1 shows a top plan view of a disc brake according to an embodiment of the present invention.

With reference to the aforesaid figures, reference numeral 1 indicates a brake disc as a whole according to the present invention.

According to a general embodiment of the invention, shown in the accompanying figures, the disc brake 1 comprises a braking band 2, provided with two opposed braking surfaces 2a and 2b, each of which at least partially defines one of the two main faces of the disc.

The braking band 2 can be made of aluminum or aluminum alloy or may be made of cast iron or steel.

Preferably, the braking band is made of gray cast iron. In particular, the entire disc is made of gray cast iron. Therefore, in the following description, reference will be made to a disc made of gray cast iron, without however excluding the possibility of it being made of aluminum or aluminum alloys or steel.

The disc 1 is provided with:
- a base protective coating 30 which covers at least one of the two braking surfaces of the braking band and is made in direct contact with such surfaces; and
- a surface protective coating 3 which covers at least one of the two braking surfaces of the braking band and is made to cover the aforesaid base protective coating 30.

The base protective coating 30 consists of chromium carbide ($Cr_3C_2$) and nickel-chromium (NiCr) and is obtained by depositing directly on the disc 1 chromium carbide and nickel-chromium in particle form by HVOF technique or by HVAF technique or by KM (Kinetic Metallization) technique.

Preferably, the base protective coating 30 consists of 65% to 95% of chromium carbide ($Cr_3C_2$) and the rest of nickel-chromium (NiCr).

In particular, the base protective coating 30 may have the following compositions:
- 93% by weight of chromium carbide ($Cr_3C_2$), and 7% of nickel-chromium (NiCr);
- from 90% by weight of chromium carbide ($Cr_3C_2$), and 10% of nickel-chromium (NiCr);
- from 75% by weight of chromium carbide ($Cr_3C_2$), and 25% of nickel-chromium (NiCr); or
- from 65% by weight of chromium carbide ($Cr_3C_2$), and 35% of nickel-chromium (NiCr).

Preferably, the base protective coating 30 consists of 75% by weight of chromium carbide ($Cr_3C_2$) and of 25% of nickel-chromium (NiCr).

Preferably, the nickel-chromium (NiCr) consists of 80% of nickel and of 20% chromium.

According to the invention, the surface protective coating 3 consists of tungsten carbide (WC) and of iron (Fe), chromium (Cr) and aluminum (Al) and is obtained by depositing on the base protective coating 30 tungsten carbide (WC), iron (Fe), chromium (Cr) and aluminum (Al) in particle form by HVOF technique or by HVAF (High Velocity Air Fuel) technique or by KM (Kinetic Metallization) technique.

Preferably, the surface protective coating 3 consists of 75% to 87% by weight of tungsten carbide (WC) and iron (Fe), chromium (Cr) and aluminum (Al) for the rest. Even more preferably, the surface protective coating 3 consists of 85% by weight of tungsten carbide (WC) and 15% by weight of iron (Fe), chromium (Cr) and aluminum (Al).

Advantageously, the thickness of the base protective coating 30 is between 20 μm and 60 μm, and preferably equal to 40 μm, while the thickness of the surface protective coating 3 is between 30 μm and 70 μm, and preferably equal to 50 μm.

Surprisingly, it has been found that the surface protective coating 3 consisting of tungsten carbide (WC), iron (Fe), chromium (Cr) and aluminum (Al) has a behavior comparable to a surface protective layer consisting of tungsten carbide and cobalt in terms of both wear-resistance and tribological behavior (friction, fading, run-in) in normal environmental conditions.

It was also determined that the surface protective coating 3 consisting of tungsten carbide (WC), iron (Fe), chromium (Cr) and aluminum (Al) has the best performance in terms of strength in presence of environmental stresses (thermal shocks and salt damage) with respect to a surface protective layer consisting of tungsten carbide and cobalt.

In other words, the surface protective coating according to the present invention (WC, Fe, Cr and Al) proves to be a perfect substitute of coatings made of tungsten carbide and cobalt, with the advantage of being completely cobalt-free and of even displaying performance improvements in given operating situations (see strength in the presence of environmental stresses).

It has also been experimentally verified that, similarly to the protective layer of tungsten carbide and cobalt described in WO2017046681A1, the surface protective coating made of WC, Fe, Cr and according to the present invention also couples well to a base protective layer 3 made of chromium carbide ($Cr_3C_2$) and nickel-chromium (NiCr), allowing the latter to perform its anti-corrosive function and thus prevent the onset of the peeling phenomena.

Indeed, even in a disc brake equipped with a surface protective coating according to the invention (i.e. made of WC, Fe, Cr and Al), it has been verified that the presence of the base protective coating 30 made of chromium carbide ($Cr_3C_2$) and nickel-chromium (NiCr) under the surface protective coating 3 substantially eliminates the phenomena of the peeling which afflict traditional discs.

More in detail, in traditional discs with protective coatings it has been found that the peeling is induced by the oxidation of the interface zone between disc and coating. Such an oxidation is generally caused by the penetration of moisture between the disc and the coating. The presence of a layer of chromium carbide ($Cr_3C_2$) and nickel-chromium (NiCr) which forms the base protective coating 30 effectively contrasts such oxidative phenomena, whereby solving the problem of peeling of the surface protective coating 3 with anti-wear function. In other words, the base protective coating 30 has an anti-corrosive function, which is associated with the anti-wear function of the surface protective coating 3 (made of tungsten carbide and iron, chromium and aluminum). The anti-corrosive action goes to the benefit of the integrity and the adhesion of the surface protective coating 3 to the disc.

The base protective coating 30 also performs a mechanical "damping" function for the surface protective coating (anti-wear). Indeed, the base protective coating 30 formed by chromium carbide and nickel-chromium has a higher degree of ductility than the surface protective coating 3 formed by tungsten carbide, iron, chromium and aluminum. This confers an elastic behavior to the base layer 30 which helps mitigate—at least in part—the stresses imparted to the disc when in use. Therefore, the base protective coating 30 acts as a sort of damper or cushion between the disc and the surface protective coating 3. This prevents a direct transmission of stresses between the two parts, whereby reducing the risk of triggering of cracks in the surface protective coating 3.

As regards the anti-wear function, the surface protective coating 3 is not biased by the presence of the base protective coating 30 made of chromium carbide and nickel-chromium.

\* \* \*

For the sake of simplicity, the brake disc 1 will now be described together with the method according to the present invention. The brake disc 1 is made preferably, but not necessarily, with the method according to the invention described below.

According to a general implementation of the method according to the invention, the method comprises the following operating steps:

a) arranging a brake disc, comprising a braking band provided with two opposed braking surfaces, each of which defines at least partially one of two main sides of the disc, the braking band being made of aluminum or aluminum alloy or being made of gray cast iron or steel;

b) depositing on the disc a layer of chromium carbide (Cr3C2) and nickel-chromium (NiCr) in particle form by HVOF (High Velocity Oxygen Fuel) technique or by HVAF (High Velocity Air Fuel) technique or by KM (Kinetic Metallization) technique, whereby forming a base protective coating covering at least one of the two braking surfaces of the braking band in direct contact therewith; and c) depositing on said base protective coating a material in particle form consisting of tungsten carbide (WC), iron (Fe), chromium (Cr) and aluminum (Al) by HVOF (High Velocity Oxygen Fuel) technique or by HVAF (High Velocity Air Fuel) technique or by KM (Kinetic Metallization) technique, forming a surface protective coating, consisting of tungsten carbide (WC) and iron (Fe), chromium (Cr) and aluminum (Al) and covering at least one of the two braking surfaces of the braking band.

Preferably, the material in particle form deposited in the step b) of depositing for making the base protective coating 30 consists of 65% to 95% of chromium carbide (Cr3C2) and nickel-chromium (NiCr) for the rest.

In particular, the material in particle form deposited in step b) of depositing to make the base protective coating 30 may have the following compositions:

93% by weight of chromium carbide (Cr3C2), and 7% of nickel-chromium (NiCr);

from 90% by weight of chromium carbide (Cr3C2), and 10% of nickel-chromium (NiCr);

from 75% by weight of chromium carbide (Cr3C2), and 25% of nickel-chromium (NiCr); or from 65% by weight of chromium carbide (Cr3C2), and 35% of nickel-chromium (NiCr).

Preferably, the material in particle form deposited in the step b) of depositing for making the base protective coating 30 consists of 75% by weight of chromium carbide (Cr3C2) and 25% of nickel-chromium (NiCr).

Preferably, the nickel-chromium (NiCr) consists of 80% of nickel and of 20% chromium.

Preferably, the material in particle form deposited in the step c) of depositing for making the surface protective coating 3 consists of 75% to 87% by weight of tungsten carbide (WC) and iron (Fe), chromium (Cr) and aluminum (Al) for the rest.

Preferably, the material in particle form deposited in the step c) of depositing for making the surface protective coating 3 consists of 10% to 17% by weight of iron (Fe), from 2.5% to 5.8% by weight of chromium (Cr), 0.6% to 2.2% by weight of aluminum (Al) and the rest by tungsten carbide (WC).

Even more preferably, the surface protective coating 3 which is obtained consists of 85% by weight of tungsten carbide (WC) and 15% by weight of iron (Fe), chromium (Cr) and aluminum (Al).

Advantageously, the brake disc is provided with a portion adapted to fix the disc to a vehicle, constituted by an annular portion 4 which is arranged centrally with respect to the disc 1 and concentric to the braking band 2. The fixing portion 4 supports the connection element 5 to the wheel hub (i.e. to the bell). The bell may be formed in one piece with the annular fixing portion (as shown in the accompanying figures) or may be formed separately and then fixed by means of appropriate connecting elements to the fixing portion.

The annular fixing portion 4 can be made of the same material as the braking band, i.e. of gray cast iron, or another appropriate material. The bell 5 can also be made of gray cast iron or other appropriate material. In particular, the entire disc (i.e. braking band, fixing portion and bell) can be made of gray cast iron.

Preferably, the braking band 2 is made by casting. Similarly, when they are made of gray cast iron, the fixing portion and/or the bell may be produced by casting.

The annular fixing portion can be made in a single body with the braking band (as shown in the accompanying figures) or can be made as a separate body, mechanically connected to the braking band.

Preferably, the step b) of depositing the layer of chromium carbide and nickel-chromium is preceded by a step d) of preparing the surface on which the base protective coating 30 is to be made. In particular, the step d) of surface preparing consists in cleaning the surface with solvents adapted to remove oil or dirt. Preferably, the step d) of preparing may comprise abrasive actions on the surface of the disc, e.g. by sanding or polishing.

Advantageously, the material in particle form (chromium and nickel-chromium) which is deposited in step b) for forming the base protective coating 30 has a particle size between 5 and 40 μm. The choice of such a range of values allows to confer high properties of deposition surface density and adhesion capacity to the coating.

Preferably, the thickness of the base protective coating 3 is between 20 μm and 60 μm, and preferably equal to 40 μm. The choice of such a range of values allows to achieve an optimum balance between the effectiveness of the anti-oxidizing protective action and limitation of the thermal expansions on the coating itself. In other words: if the thickness of the base protective coating 30 were less than 20 μm, there would not be a sufficient anti-oxidizing protective action. A thickness greater than 60 μm, on the other hand, could lead in time to an imperfect adhesion due to thermal expansions which occur during the life cycle of a disc brake.

Within the aforesaid range of thicknesses of the base protective coating 30 can perform the aforementioned "damper" effect which helps preserve the integrity of the surface protective coating 3.

Advantageously, the material in particle form (tungsten carbide, iron, chromium and aluminum) which is deposited in step c) for forming the surface protective coating has a particle size between 5 and 45 μm. The choice of such a range of values allows to confer high properties of density, hardness and limited porosity to the coating.

Preferably, the thickness of the surface protective coating 3 is between 30 μm and 70 μm, and preferably equal to 50 μm. The choice of such a range of values allows to achieve an optimum balance between the consumption of the protective layer and the limitation of the thermal expansions on the coating itself. In other words, if the thickness of the protective coating were less than 20 μm, in case of wear, it would be totally removed in an excessive short time. A thickness greater than 80 μm, on the other hand, could lead in time to an imperfect adhesion due to thermal expansions which occur during the life cycle of a disc brake.

* * *

As mentioned, both the chromium carbide and the nickel-chromium which form the base protective coating 30, and the tungsten carbide, iron, chromium and aluminum which form the surface protective coating 3 are deposited in particle form respectively on the disc and base protective coating 30 by HVOF technique or by HVAF technique or by KM technique.

These three deposition techniques are well known to a person skilled in the art and will therefore not be described in detail.

HVOF (High Velocity Oxygen Fuel) is a powder spray deposition technique which uses a spray device provided with a mixing and combustion chamber and with a spray nozzle. Oxygen and fuel are fed to the chamber. The hot combustion gas which forms at pressures close to 1 MPA crosses the convergent-divergent nozzle conveys the material in powder to hypersonic speed (i.e. higher than MACH 5). The material in powder to be deposited is injected into the hot gas flow, in which it melts rapidly and is accelerated to a speed of the order of 1000 m/s. Once it has impacted onto the deposition surface, the molten material cools rapidly and a very dense and compact structure is formed by virtue of the high kinetic energy impact.

The HVAF (High Velocity Air Fuel) deposition technique is similar to the HVOF technique. The difference is in that air instead of oxygen is supplied into the combustion chamber in the HVAF technique. Therefore, the temperatures in hand are lower than those of the HVOF technique. This allows a better control of the thermal alteration of the coating.

The KM (Kinetic Metallization) deposition technique is a solid-state deposition process in which metal powders are sprayed through a sonic deposition nozzle in two steps which accelerate and triboelectrically charge the metal particles in an inert gas flow. Thermal energy is supplied in the carrier stream. The potential energy of the compressed inert gas flow and of the thermal energy is converted into kinetic energy of the powders in the process. Once accelerated at high speed and electrically charged, the particles are directed against the deposition surface. The high-speed collision of the metal particles with such a surface causes a large deformation of the particles (approximately 80% in a direction perpendicular to the impact). This deformation results in an enormous increase in the surface area of the particles. As an effect of the impact, intimate contact is formed between the particles and the deposition surface, which leads to the formation of metallic bonds and a coating having a very dense and compact structure.

Advantageously, as an alternative to the three deposition techniques listed above, which share the fact of being high kinetic energy impact deposition techniques, there are other techniques which exploit different deposition methods, but which can generate coatings having a very dense and compact structure.

The combination of the HVOF, HVAF or KM deposition techniques and of the chemical components used for forming the two protective coatings—base 30 and surface 3—allows to obtain protective coatings with high bond strength on lower material on which they are deposited.

In particular, the aforesaid combination allows to obtain a high degree of anchoring both of chromium carbide and nickel-chromium (base coating 30) on the gray cast iron or steel, and of the tungsten carbide, iron, chromium and aluminum (surface coating 3) on the layer of chromium carbide and nickel-chromium.

The absence of free carbon (C), preferably not present even in trace form in the final materials which constitute the two coatings, helps to reduce the risk of detachments. Indeed, it has been found that in the case of application of the coating with flame spray techniques, a cause of the detachment of conventional protective coatings from discs made of aluminum or aluminum alloy or of gray cast iron or steel is the presence of free carbon in the protective coating. Indeed, the carbon tends to burn, combining with the oxygen incorporated in the protective coating being formed. This leads to the formation of micro-bubbles inside the coating, which can prevent an adequate adhesion of the coating onto the disc, whereby facilitating its removal.

According to a particularly preferred embodiment of the invention, both the material in particle form deposited in the step b) of depositing for making the base protective coating 3 and the material in particle form deposited in the step c) of depositing for making the surface protective coating 30 are deposited by means of HVOF (High Velocity Oxygen Fuel) technique. Indeed, it has been found that this technique—in particular if associated with a braking band or with an entire disc made of gray cast iron—allows to achieve a combined protective coating (base+surface) which offers the best compromise in terms of wear-resistance and tribological performance.

More in detail, according to experimental tests performed with respect to the (preferred) HVOF (High Velocity Oxygen Fuel) technique, the HVAF (High Velocity Air Fuel) technique allows to obtain compact and uniform coatings with regular thickness close to nominal values. The coatings made with HVOF are less compact, have a "spongy" appearance and variable thickness.

The thermal shock tests conducted on samples having coatings made by HVOF and HVAF showed damage which affected only the WC+Fe, Cr, Al surface protective coating, found on all specimens and which consists in a micro-cracking of the coating. Such a micro-cracking however appears to be more pronounced in specimens with coatings made by HVAF technique, probably due to the greater rigidity of the application. This makes the HVOF technique more preferable.

In all cases, the base protective coating made of $Cr_3C_2$+Ni did not suffer consequences following the thermal shock test, always being dense, perfectly adhered to the cast iron and free from cracks.

* * *

As mentioned above, the base protective coating 30 and the surface protective coating 3 cover at least one of the two braking surfaces of the braking band.

The whole of the base protective coating 30 and of the surface protective coating 3 will be identified globally hereinafter as "combined protective coating" 3, 30.

Figure 2:
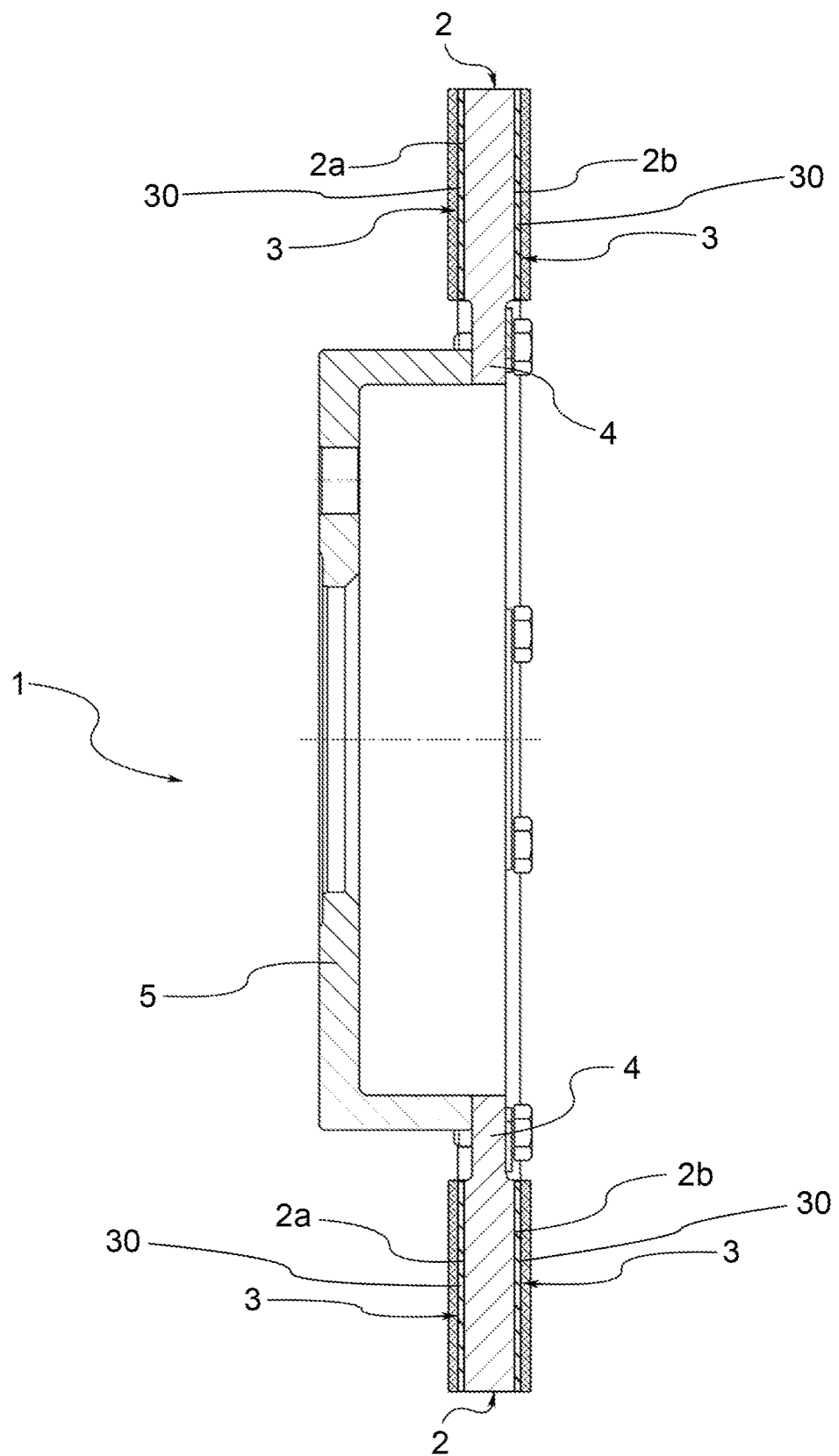
FIG. 2 shows a section view of the disc in FIG. 1 taken along the section line II-II indicated thereon.

Preferably, as shown in FIG. 2, the disc 1 is provided with a "combined protective coating" 3, 30 which covers both braking surfaces 2a and 2b of the braking band 2.

In particular, the combined protective coating 3, 30 may cover only the braking band, on a single braking surface or on both.

According to solutions of embodiments not shown in the accompanied figures, the combined protective coating 3, 30 may extend also to other parts of the disc 1 as the annular fixing portion 4 and the bell 5, to cover the entire surface of the disc 1. In particular, the combined protective coating 3, 30 can cover—in addition to the braking band—only the fixing portion or only the bell. The choice is substantially dictated by reasons of appearance, in order to have a uniform coloring and/or finishing on the entire disc or between some portions of it.

Advantageously, the particle material depositing for the formation of the combined protective coating 3, 30 may be performed in differentiated manner on the surface of the disc at least in terms of the coating thickness.

At the braking band, the combined protective coating 3, 30 can be made with the same thickness in the two opposite braking surfaces. Alternative solutions can be provided in which the combined protective coating 3, 30 is made by differentiating the different thicknesses between the two braking surfaces of the braking band.

According to a particularly preferred embodiment of the method, the step b) of depositing the layer of chromium carbide and nickel-chromium for forming the base protective coating 30 comprises two or more distinct steps of depositing the particle chromium carbide on the surface itself to form the protective coating.

In more detail, said step b) of depositing comprises:
 a first step of depositing the chromium carbide and the nickel-chromium in particle form to create a first layer of the base protective coating 30 directly on the disc; and
 a second step of depositing the chromium carbide and the nickel-chromium in particle form to create a second layer on the first layer.

As will be clarified below, the second finishing layer allows to adjust the surface finish of the base protective coating 3.

The division of the step b) of depositing the chromium carbide and nickel-chromium into two steps allows, in particular, to differentiate at least the particle size of the chromium carbide and nickel-chromium used in the various steps. This makes the step b) of depositing more flexible.

Advantageously, the particle chromium carbide and the nickel-chromium deposited in the first deposition step has a particle size greater than that deposited in the second deposition step. In particular, the chromium carbide and nickel-chromium deposited in the first deposition step have a particle size between 30 and 40 μm, while the chromium carbide and nickel-chromium deposited in the second deposition step have a particle size between 5 and 20 μm.

Making the base protective coating 30 in two distinct deposition steps, using a coarser particle size for the formation of the first layer and a finer particle size for the formation of the second layer (with finishing function), allows to obtain a coating which already at the end of the deposition has the required surface finish characteristics, as a function of the subsequent surface protective coating deposition. Such desired surface finishing characteristics can be obtained without needing to grind and/or perform other surface finishing operations for the coating. The particles deposited in the second step fill the coarse roughness on the surface of the base layer. Advantageously, the surface finishing level of the coating can be adjusted by adjusting the particle size of the particles deposited in the second step.

Preferably, the thickness of the first layer of the base protective coating 30 is between ¼ and ¾ of the total thickness of the coating, while the thickness of the second layer of the base protective coating 4 is between ¼ and ¾ of the total thickness of the coating.

According to a particularly preferred embodiment of the method, the step c) of depositing the particle material (WC+Fe+Cr+Al) which forms the surface protective coating 3 comprises two or more distinct steps of depositing the particle material onto the same surface to form the protective coating.

In more detail, said step c) of depositing comprises:
 a first step of depositing the material in particle form to create a first layer of the coating directly on the base protective coating 30; and
 a second step of depositing the material in particle form to create a second layer on the first layer of surface protective coating 3.

Similarly to that provided in step b) of depositing the base coating, dividing step c) of depositing the particle material which forms the surface protective coating 3 into two or more steps, in particular, also allows to differentiate between at least the particle size of the particle material used in the various steps. This makes the step c) of depositing more flexible.

Advantageously, the particle material deposited in the first deposition step has a particle size greater than that deposited with the second deposition step. In particular, the particle material deposited in the first deposition step has a particle size between 30 and 40 μm, while the particle material deposited in the second deposition step has a particle size between 5 and 20 μm.

The embodiment of the protective coating or surface 3 with two distinct deposition steps, using a coarser particle size for forming the base layer and a finer grain size for forming the finishing layer, allows to obtain a surface protective coating 3 which already at the end of the deposition has the required surface finishing characteristics, without the need for grinding and/or performing other surface finishing operations for the coating. The particles deposited in the second step fill the coarse roughness on the surface of the base layer. Advantageously, the surface finishing level of the surface protection 3 can be adjusted by adjusting the particle size of the particles deposited in the second step.

In particular, by using particles with a particle size of 30 to 40 μm for the first step and particles with a particle size of 5 and 20 μm for the second step, the surface protective coating 3 has at the finishing layer a surface roughness Ra in the range between 2.0 and 3.0 μm.

Preferably, the thickness of the first layer of the surface protective coating 30 is between ¼ and ¾ of the total thickness of the coating, while the thickness of the second layer of the surface protective coating 4 is between ¼ and ¾ of the total thickness of the coating.

Overall, the combination of the HVOF, HVAF or KM deposition techniques of the particle material, the chemical components used and the method of depositing in multiple steps allows to obtain a coating with a limited level of surface roughness, particularly adapted for the purposes of use of the brake disc 1.

\* \* \*

Comparative tests between the following discs were performed:
 A) a disc brake made of gray cast iron with a "combined" protective coating according to the invention, made by the HVOF technique, with 40 μm thick base protective coating (Cr3C2+NiCr) and 50 μm thick surface protective coating (WC+Fe+Cr+Al); and
 B) a disc brake made of gray cast iron with a "combined" protective coating according to the invention, made by the HVOF technique, with 40 μm thick base protective coating (Cr3C2+NiCr) and 50 μm thick surface protective coating (WC+Co), made according to the teaching in international application WO2017/046681.

The two discs were subjected to the usual dynamic bench tests (run-in, AK Master and wear).

Such tests showed that, the test conditions being equal, the durability disc A according to the invention is comparable in terms of wear to that of the disc B.

Also from the point of view of tribological behavior (friction, fading, run-in), the test conditions being equal, the performance of the disc A according to the invention is substantially comparable to that of a traditional disc B.

The two discs were also subjected to a series of resistance tests in the presence of combined and environmental thermomechanical stresses.

As mentioned, such tests have shown that the performance of the disc A according to the invention is better than the disc B in terms of strength in presence of environmental stresses (thermomechanical shocks and corrosive agents).

In greater detail, the two discs were subjected to a test program which provides for the repetition of combined dynamic bench tests (the disc was subjected to different cycles of braking, each with multiple consecutive braking operations) and tests in corrosive environment (salt spray and condensation water test: disc and brake pads were kept in salt spray and in an environment with a high degree of moisture with high temperature excursions).

At the end of set repetitions, B displayed a generalized removal of the protective coating, while disc A had only a minimal localized detachment of the protective coating.

* * *

As it can be appreciated from the description above, the disc brake and the method for making such a disc brake according to the invention allows to overcome the disadvantages of the prior art.

Indeed, the protective coatings of which the brake discs made according to the invention are provided are not subject to peeling or are subject to it to a much lesser degree than the known solutions (so as to ensure in time a wear resistance) and at the same time do not contain cobalt.

Indeed, it has been found that the cobalt-free surface protective coating according to the invention can effectively replace the tungsten carbide and cobalt coating provided in WO2017046681A1. Indeed, the surface coating according to the invention has shown a similar wear-resistance and a similar tribological behavior in normal environmental conditions.

It was also determined that the surface protective coating according to the invention (made of tungsten carbide, iron, chromium and aluminum) has the best performance in terms of strength in presence of environmental stresses (thermal shocks and salt damage).

Furthermore, it has been found that the cobalt-free surface protective coating according to the invention can effectively couple with the base protective coating made of chromium carbide and nickel-chromium, allowing the latter to apply its anti-corrosive action, whereby avoiding peeling of surface protective coating.

In other words, the cobalt-free surface protective coating according to the invention does not affect the action of the base protective coating consisting of chromium carbide and nickel-chromium. So, such a base protective coating continues to inhibit disc oxidation phenomena (made of aluminum, aluminum alloy, gray cast iron or steel).

In particular, the base protective coating made of chromium carbide and nickel-chromium continues to define also a sort of damper or elastic cushion between the disc and the anti-wear surface protective coating, whereby reducing the risk of cracking of the latter as a result of stresses related to the operating life of the disc.

Finally, the disc 1 according to the invention is provided with a surface protective coating (which covers at least the braking band) having:
 a high bond strength, which ensures a high degree of anchoring onto the base protective coating made of chromium carbide and nickel-chromium;
 high wear-resistance;
 limited level of surface roughness;
 high density;
 high hardness; and
 limited porosity.

The brake disc 1 is also generally cost-effective to be made.

In order to satisfy contingent, specific needs, those skilled in art can make several changes and variants to the disc and brake disc described above, all contained within the scope of the invention defined by the following claims.

The invention claimed is:

1. A brake disc for a disc brake, comprising a braking band provided with two opposite braking surfaces, each of which defines at least partially one of two main sides of the disc, the braking band being made of aluminium or made of aluminium alloy or being made of grey cast iron or steel; said disc being provided with:
 a base protective coating covering at least one of the two braking surfaces of the braking band, said base protective coating consisting of chromium carbide ($Cr3C2$) and nickel-chromium (NiCr) and being obtained by depositing directly on the disc chromium carbide ($Cr3C2$) and nickel-chromium (NiCr) in particle form by HVOF (High Velocity Oxygen Fuel) technique, or by HVAF (High Velocity Air Fuel) technique or by KM (Kinetic Metallization) technique;
 a surface protective coating covering at least one of the two braking surfaces of the braking band, said surface protective coating consisting of tungsten carbide (WC), iron (Fe), chromium (Cr) and aluminum (Al) and being obtained by depositing on the base protective coating tungsten carbide (WC), iron (Fe), chromium (Cr) and aluminum (Al) in particle form by HVOF technique, or by HVAF (High Velocity Air Fuel) technique or by KM (Kinetic Metallization) technique.

2. The brake disc according to claim 1, wherein the base protective coating consists of 65% to 95% chromium carbide ($Cr3C2$) and the balance of nickel-chromium (NiCr).

3. The brake disc according to claim 1, wherein the surface protective coating consists of 75% to 87% by weight of tungsten carbide (WC) and the balance of iron (Fe), chromium (Cr) and aluminum (Al), including 85% by weight of tungsten carbide (WC) and 15% by weight of iron (Fe), chromium (Cr) and aluminum (Al).

4. The brake disc according to claim 1, wherein the base protective coating has a thickness of between 20 μm and 60 μm.

5. The brake disc according to claim 1, wherein the surface protective coating has a thickness of between 30 μm and 70 μm.

6. The brake disc according to claim 1, wherein the braking band is made of grey cast iron, including the entire disc being made of grey cast iron.

7. The brake disc according to claim 1, wherein the base protective coating has a thickness equal to 40 μm.

8. The brake disc according to claim 1, wherein the surface protective coating has a thickness equal to 50 μm.

\* \* \* \* \*